United States Patent [19]

Ueda

[11] Patent Number: 5,634,094
[45] Date of Patent: May 27, 1997

[54] TEXT PROCESSING APPARATUS

[75] Inventor: Hiroyuki Ueda, Yokohama, Japan

[73] Assignee: Canon Kabushiki Kaisha, Tokyo, Japan

[21] Appl. No.: 460,759

[22] Filed: Jun. 2, 1995

Related U.S. Application Data

[63] Continuation of Ser. No. 109,456, Aug. 20, 1993, abandoned, which is a continuation of Ser. No. 674,304, Mar. 25, 1991, abandoned, which is a continuation of Ser. No. 260,024, Oct. 20, 1988, abandoned.

[30] Foreign Application Priority Data

Oct. 23, 1987 [JP] Japan ................................ 62-268851

[51] Int. Cl.$^6$ ............................................ G06F 15/00
[52] U.S. Cl. ........................................ 395/779; 395/778
[58] Field of Search .................................. 395/155, 161, 395/148, 145, 146; 400/63, 83; 364/200 MS File, 900 MS File; 345/141, 144

[56] References Cited

U.S. PATENT DOCUMENTS

| | | | |
|---|---|---|---|
| 2,217,150 | 10/1940 | Ayres | 400/7 |
| 3,466,604 | 9/1969 | Sinnott | 199/51 |
| 4,092,729 | 5/1978 | Rosenbaum et al. | 364/900 |
| 4,138,719 | 2/1979 | Swanstrom et al. | 364/200 |
| 4,354,765 | 10/1982 | Buchanan et al. | 400/7 |
| 4,498,144 | 2/1985 | Haneda et al. | 364/900 |
| 4,678,351 | 7/1987 | Curley | 400/64 |
| 4,763,279 | 8/1988 | Kellam et al. | 364/518 |
| 4,783,760 | 11/1988 | Carosso | 364/900 |
| 4,802,104 | 1/1989 | Ogiso | 364/518 |
| 4,812,999 | 3/1989 | Ohara | 364/518 |

FOREIGN PATENT DOCUMENTS

| | | |
|---|---|---|
| 0098959 | 1/1984 | European Pat. Off. . |
| 53-39834 | 4/1978 | Japan . |
| 58-50374 | 3/1983 | Japan . |

OTHER PUBLICATIONS

IBM Technical Disclosure Bulletin, "Display–Hyphenate Scan", McConnel, et al., vol. 12, No. 4, Sep. 1969, pp. 520–521.

*Primary Examiner*—Phu K. Nguyen
*Attorney, Agent, or Firm*—Fitzpatrick, Cella, Harper & Scinto

[57] ABSTRACT

A text processing apparatus allowing a line-end process to be performed easily, namely the division of a line-end word and hyphening. If a word at the end of a line exceeds the area of display or printing, the word is automatically transferred to a next line, but a part of the word that can be returned to the end of the original line is identified, and the operator can insert a hyphen after that part. Upon insertion of the hyphen, the above-mentioned part is returned to the end of the original line, and the remaining part of the word is displayed on the next line. In this manner the hyphenating of line-end word is made easy to perform on the display, and printing can be obtained in the form as displayed.

17 Claims, 6 Drawing Sheets

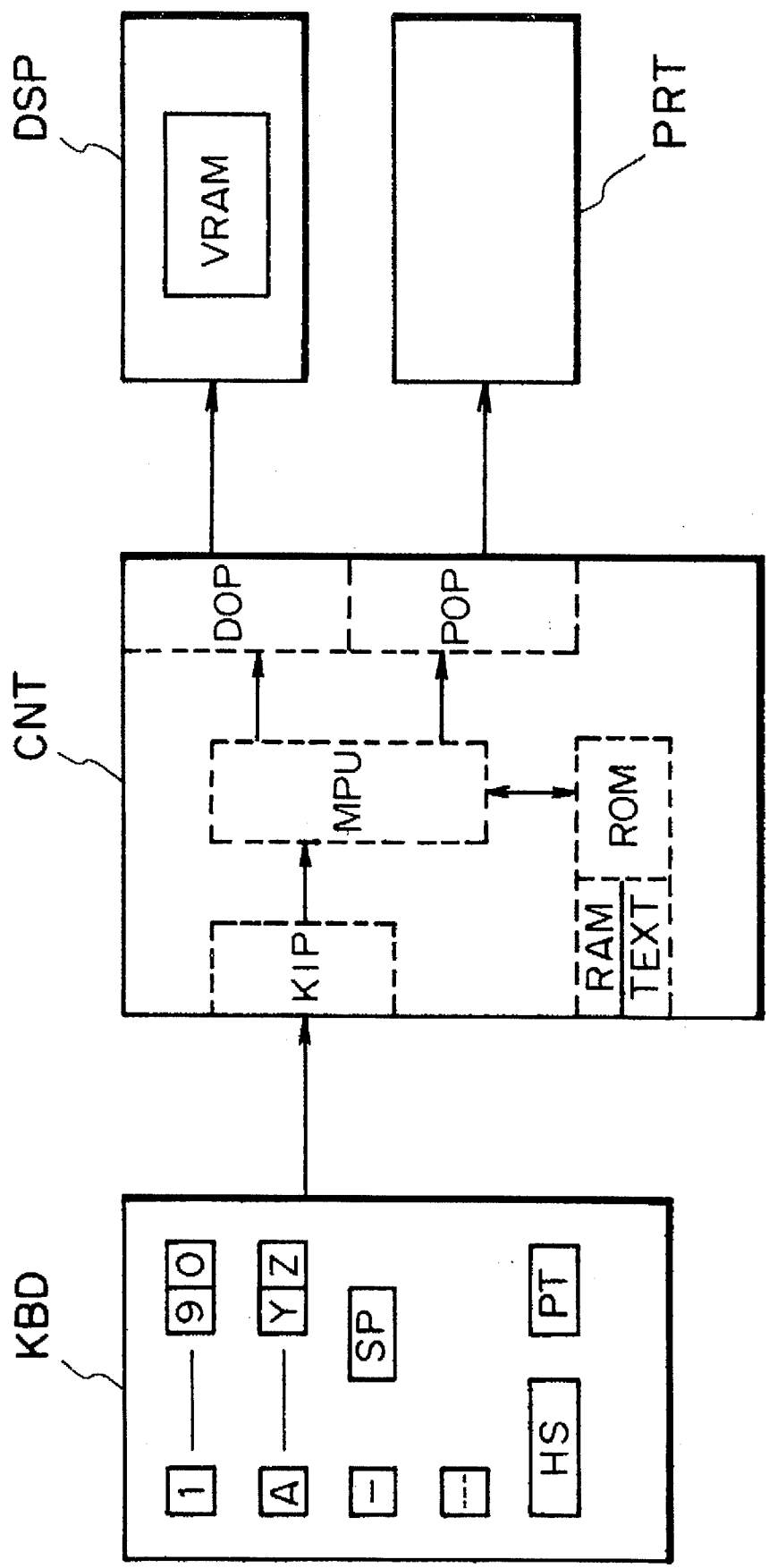
FIG. I

FIG. 2A

| A | SP | B | F | SP | G | SP | H | SP | I | SP | J | SP | K |

FIG. 2B

| A | SP | B | F | SP | G | SP | H1 | - | H2 | SP | I | SP | J | SP | K |

FIG. 3

| 54 | 68 | 69 | 73 | 20 | 69 | 73 | 20 |
| T  | h  | i  | s  | SP | i  | s  | SP |

A: "This "
B: "is "

TEXT PROCESSING APPARATUS

This application is a continuation, of application Ser. No. 08/109,456, filed Aug. 20, 1993, now abandoned, which is a continuation of application Ser. No. 07/674,304, filed Mar. 25, 1991, now abandoned, which is a continuation of application Ser. No. 07/260,024, filed Oct. 20, 1988, now abandoned.

BACKGROUND OF THE INVENTION

1. Field of the Invention

The present invention relates to a text processing apparatus, and more particularly to a text processing apparatus with improved control on the arrangement of a information at the boundary of visible text area.

2. Related Background Art

There have already been made various inventions for line-end control of a word processor, an electronic typewriter or the like. For example the Japanese Patent Publication No. 58-50374 discloses a technology of terminating a line if a space or a hyphen is inserted in a specified "hot" zone at the end of a line. Also the Japanese Laid-open Patent Application No. 53-39834 discloses a technology, if characters are entered beyond the right-hand margin, of finding a space or a hyphen closest to the right-hand margin in a specified zone at the end of a line and terminating a line at the space or hyphen, or, if the specified zone does not contain space nor hyphen, of soliciting the operator to insert a hyphen. Also the technologies related to the present invention are disclosed in the U.S. Pat. Nos. 2,217,150, 3,466,604 and 4,138,719, but these resemble the above-mentioned technologies or combinations thereof.

The above-mentioned technologies are principally applied at the printing operation, but are not suitable to a word processor or an electronic typewriter employing the recent concept of providing a display exactly same as what is printed, or "What you see is what you get", achieved by recent progress in the display and editing technologies. On the other hand, in the conventional technology in which the display does not exactly correspond to what is printed, the line-end processing has to be done during printing, so that the operator is required to conduct the hypen insertion during the printing operation.

SUMMARY OF THE INVENTION

An object of the present invention is to provide a text processing apparatus capable of executing a process relating to the printing also on an editing display, thereby improving the operability of the apparatus.

The above-mentioned object can be achieved, according to the present invention, by a text processing apparatus comprising input means for entering information; memory means for storing the information entered from the input means; display means for displaying the information stored in the memory means; printing means for printing the information stored in the memory means; and determining means for determining, in case the information read from the memory means overflows an area of visualization by the display means or the printing means, whether to visualize the information in a text line or to insert a hyphen into the information; and informing means for informing the operator when the determining means identifies a case of inserting the hyphen.

Another object of the present invention is to provide a text processing apparatus comprising:

input means for entering character information and hyphen information;

memory means for storing the information entered by the input means;

display means for displaying the information stored in the memory means;

first control means for displaying, when information read from the memory means overflows a visual area of the display means, the overflowing information in a next line;

second control means for deriving, from the character information displayed in the next line by the first control means, the character information that can be transferred to the original line, and enabling to insert hyphen information from the input means in a position immediately succeeding thereto; and third control means adapted, when hyphen information is entered by the input means into the position allowing insertion of the hyphen information, for returning a part of the information to the original line, moving the hyphen information to the start of the next line, and displaying the transferrable information immediately succeeding to the hyphen information.

BRIEF DESCRIPTION OF THE DRAWINGS

FIG. 1 is a block diagram of a text processing apparatus employed in the present invention;

FIG. 2A is a view showing the content of a text buffer;

FIG. 2B is a view showing the content of the text buffer shown in FIG. 2A when a hyphen is inserted therein;

FIG. 3 is a view showing character codes to be stored in the text buffer;

DETAILED DESCRIPTION OF THE PREFERRED EMBODIMENTS

Figure 4A:
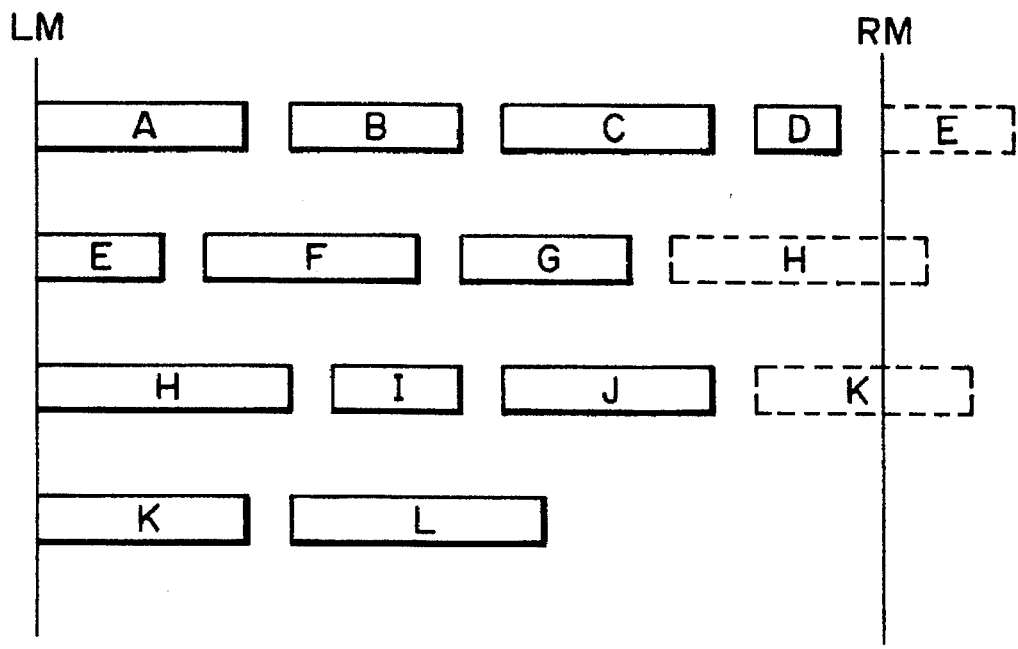
FIG. 4A is a view showing a display or print operation prior to hyphen scanning.

Now the present invention will be clarified in detail by the embodiment thereof shown in the attached drawings. FIG. 1 shows a text processing apparatus of the present invention, composed of a keyboard KBD, a controller CNT, a display unit OSP, and a printer unit PRT. The keyboard KBD is provided with numeral keys "1"–"0", alphabet keys "A"–"Z", a space key "SP" for making a space between words, a hyphen key "-", and a soft hyphen key ". . . ". The use of the soft hyphen key will be explained later. In addition, there are at least provided a hyphen search key "HS", a print key "PT", and a back space key "BS". Also there are provided a return key and a tabulator key. Consequently the keyboard KBD can be a keyboard suitable for the text processing apparatus, namely a typewriter keyboard, or an ASCII keyboard common in personal computers. The input key means for soft hyphening, instruction means for hyphen search and instruction means for printing are composed of respective keys in the present embodiment, but they may be replaced by combinations of a control key and numeral/alphabet keys in case of the ASCII keyboard. The controller CNT functions principally under the control of a microprocessor MPU, so that there are at least required a key signal input port KIP, a display output port DOP, a printer output port POP, and memories ROM and RAM.

As will be understood from the drawing, a key signal entered from the keyboard KBD is supplied, at each key actuation, to the input port KIP of the controller CNT. The controller CNT, constantly watching the input port KIP, fetches the key signal and immediately executes a corresponding processing, which is principally a text processing, such as identifying the content of the entered key signal (character information or control information), and stores it in a text area TEX of the memory RAM if it is character information. The memory RAM is also used for storing the status of the apparatus.

The memory ROM stores programs shown in the flow charts to be explained later, and a dictionary for hyphening. The information stored in the text area is released through the output ports DOP, POP, and is subjected to display and editing in passing the microprocessor MPU. For example arrangement control is executed according to format information such as N lines per page and M characters per line. The result of such processing is supplied through the display output port DOP to the display unit DSP to show, to the operator, what text has been entered or whether the entered text is correct. The display unit DSP is provided with a memory RAM of an image frame. When the operator has entered all the desired text through the keyboard KBD, and if the content thereof is confirmed, the operator depresses the print key PT, whereupon the controller CNT identifies the print instruction and causes the edited text to pass through the printer output port POP to the printer unit PRT. In this manner the operator obtains the text on paper.

Now the function of the embodiment explained above will be explained further, with reference to appended flow charts.

Figure 4B:
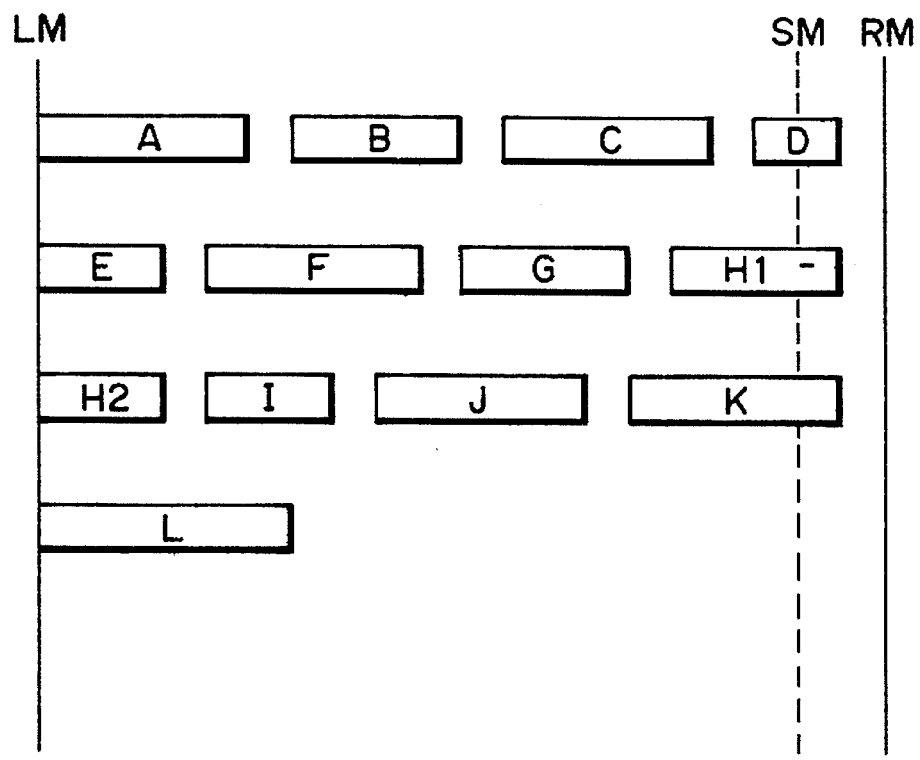
FIG. 4B is a view showing a display or print operation after hyphen scanning.

In the following there will be given a detailed explanation principally on the hyphen scanning operation of the present invention. As explained before, the controller CNT is principally composed of the microprocessor MPU, which is alone incapable of performing a controlling function but always requires memories ROM and RAM in addition to the input/output port. In general, the ROM stores a control program which can be considered a sequence of instructions to the microprocessor. On the other hand, the RAM is capable of writing and reading, and is used, in the present embodiment, for storing a cursor counter, a visualizing format, flags and a text. Thus the alphabet characters, numerals, space etc. entered from the keyboard KBD are stored in succession in the memory RAM in the form of character codes, for example ASCII codes. As an example, when words A–L are entered from the keyboard KBD, they are stored, as shown in FIG. 2A, in a text buffer TEX defined in advance in the memory RAM. Each of the words A–L is composed of plural characters, and the words are mutually separated by spaces. If the word A is "This", it is composed of ASCII character codes of 4 bytes, followed by a space code (20H). Then, if the word B is "is", it is also represented by ASCII codes of 2 bytes. In this manner there is stored a sequence of ASCII codes as shown in FIG. 3. Then, FIG. 4 shows the status of display on the display unit DSP as the result of processing, wherein LM indicates the left margin position, and RM indicates the right margin position, corresponding respectively to the left-hand and right-hand limits of the text format. In the first line, the words A to D are accommodated between the margins without difficulty. However the word E which overflows the right margin, is made visible in the second line when the first character of the word E is entered. This is called word wrap-around function. Then the words F to G can be accommodated between the margins without difficulty, but the word H overflows the right margin RM at a position close to the last character of the word H. Thus, when the right margin is exceeded at the input of the word H, the entire word H is subjected to the word wrap-around to the next third line. Thereafter the words I to L are entered, with the word wrap-around of the word K. As will be understood from the foregoing, the text processing apparatus of the present invention has the word wrap-around function, for not exceeding both margins, at the input stage. However, as will be apparent from FIG. 4A, the obtained document is visually pleasing, because the ends of the lines are not aligned. The technology of the present invention, or the hyphen-scanning function, is required for overcoming this drawback. In the following there will be explained, at first, the entire control sequence, and then the hyphen scanning and the insertion of a hyphen or a soft hyphen, while referring to a flow chart showing the actual control sequence.

Figure 5:
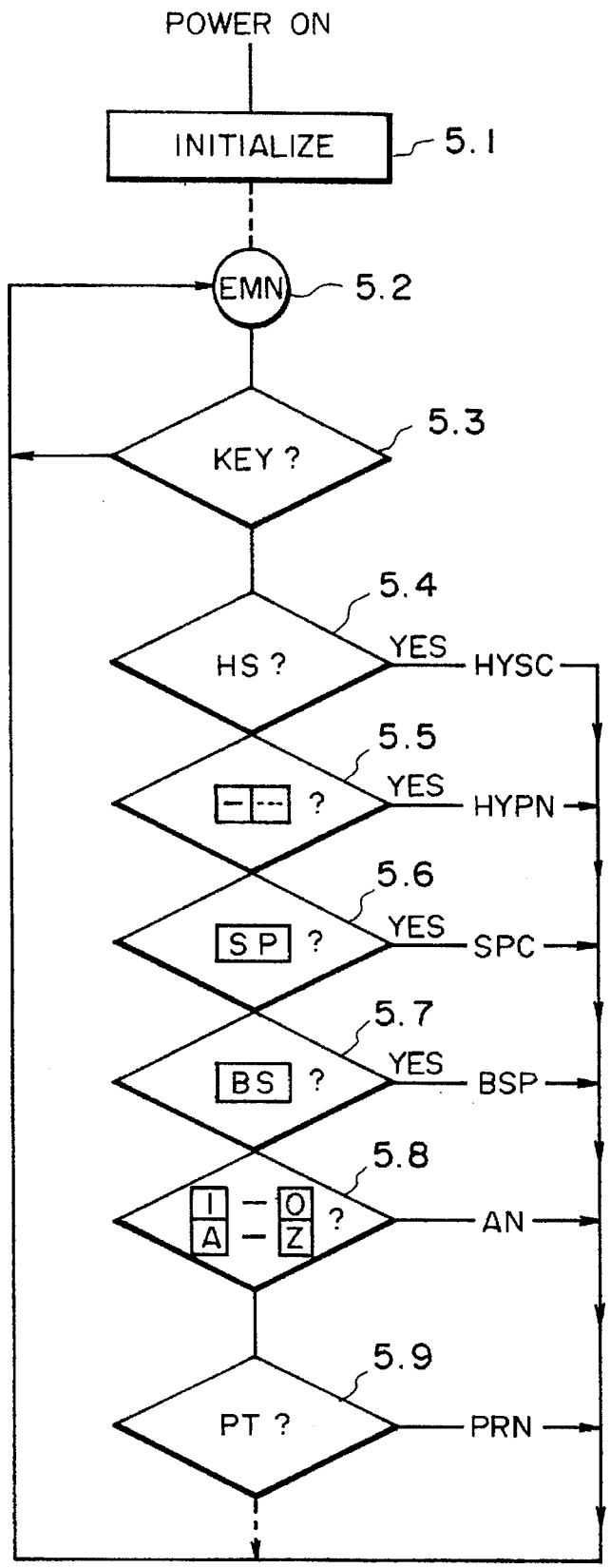
FIG. 5 is a flow chart showing the control sequence of the present invention.

FIG. 5 is a flow chart of the entire control sequence. When the power supply to the hardware shown in FIG. 1 is actuated, there is conducted initialization of the entire apparatus (step 5.1). Then the sequence proceeds to an equipment control main routine (step 5.2). The step 5.2 is a mere passing point in the control and does not execute any particular process. A next step 5.3 senses whether a key signal is present at the key input port KIP of the controller CNT shown in FIG. 1, and the sequence branches according to the result of the sensing. Thus the steps 5.2 and 5.3 are repeated during the absence of the key signal, and the sequence proceeds to a step 5.4 only when the key signal is entered. The step 5.4 discriminates whether the key HS has been actuated, and, if so, a hyphen scanning process HYSC is executed, or, if not, the sequence proceeds to a control sequence starting from a step 5.5. Thereafter steps 5.5, 5.6, 5.7, 5.8 and 5.9 respectively check the hyphen or soft hyphen key, the space key, the back space key, the alphanumeric keys and the print key, and, depending on the cases, there are executed respective processes, namely a hyphen scanning process HYSC to be explained later; a process HYPN for inserting a hyphen or a soft hyphen into a row of characters; a process SPC for inserting a space into a row of characters; a back space process BSP for moving the cursor by a step to left; an alphanumeric input process AN; and a process PRN for printing the data of the text buffer. After the execution of any of these processes, the sequence returns to the step 5.2.

Figure 6:
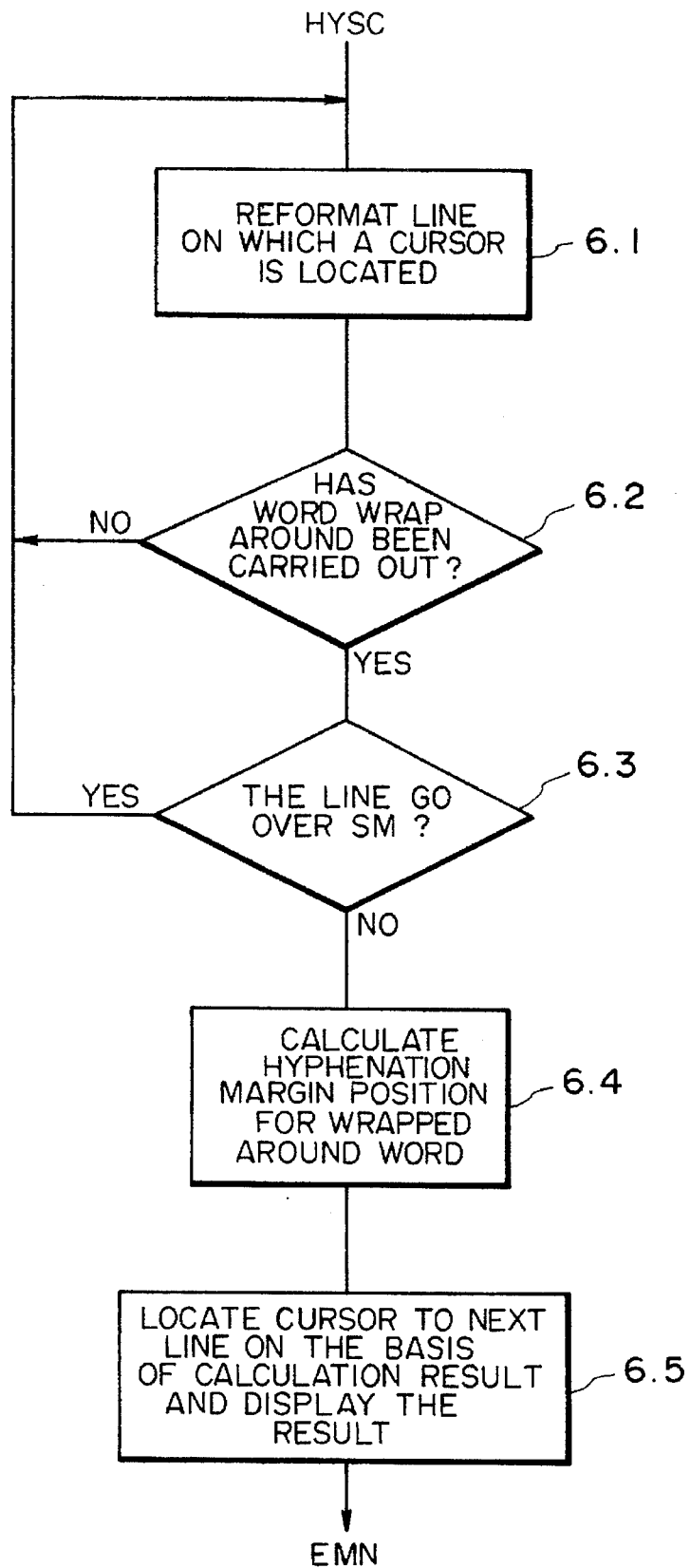
FIG. 6 is a flow chart showing the control sequence of hyphen scanning.
Figure 7:
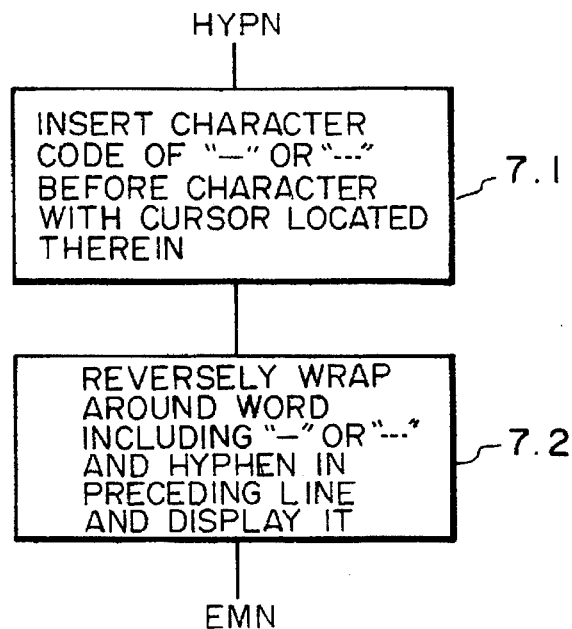
FIG. 7 is a flow chart showing the control sequence of hyphen insert ion.

The hyphen scanning process HYSC is shown in FIG. 6. In the following there is introduced a new concept, which is a special margin SM provided at a distance of several characters to the left of the right margin RM, defining the start point of the hot zone. Each line is to be ended between the special margin SM and the right margin RM. This principle is similar to that of the aforementioned hot zone, but the technology of the present invention is novel in the utilization of the special margin SM or the hot zone. More specifically, the hyphenation is conducted by the editing process on the editing image frame. At first a step 6.1 reads the row of characters from the text buffer and displays the row of characters between the left margin LM and the right margin RM (called reformatting). More specifically, if the cursor is positioned on the display at the left-end position in FIG. 4A, the words are arranged in succession, starting from the word A, from the left margin LM. The word E is subjected to word wrap-around as it overflows the right margin RM. After the reformatting of a line in this manner, a step 6.2 discriminates whether the word wrap-around is executed. Since the word wrap-around is conducted for the word E in this case, the sequence proceeds to a step 6.3. The step 6.3 discriminates whether this line overflows the aforementioned special margin SM. As the line ends with the word D, of which end is positioned between the special margin SM and the right margin RM, the control sequence returns to the step 6.1. At this point the cursor is positioned at the second line. Thus the words F, G and H are arranged succeeding to the wrapped around word E, but the word H is subjected to the word wrap-around because it overflows the right margin. In response the control sequence proceeds from the step 6.2 to 6.3. The discrimination in this step becomes negative, indicating that the end of the second line is not positioned between the special margin SM and the right margin RM. Thus the control sequence proceeds to a step 6.4 for calculating the limit point of inverse wrapping to the preceding line by inserting a hyphen into the word H. If the word H overflows the right margin by three characters, the limit position of hyphenation is at the third character from the last of the word H. A succeeding step 6.5 places the cursor accordingly on the display, thus soliciting the operator to insert the hyphen. It is to be noted that the cursor is positioned, in the above-explained example, at the fourth character from the last, since, if it is located at the limit position, the hyphen inserted after the cursor position overflows the right margin RM. Namely, the hyphen should be inserted to the left side of the character positioned by the cursor. The cursor thus positioned can be moved to a desired position, for example by moving to left with the back space key BS, as in the step 5.7 in FIG. 5. When the cursor is placed at the desired position as explained above and the operator instructs the insertion of hyphen or soft hyphen, there is executed a process HYPN starting from a step 5.5 in FIG. 5 and shown in FIG. 7. A step 7.1 inserts a character code for hyphen or soft hyphen into the text buffer, whereby the content thereof assumes a state shown in FIG. 2B. Then a step 7.2 reformats the line based on the content of the text buffer, whereby the former part, including the hyphen, of the word H is returned to the preceding line, and the status of the line is displayed on the display unit DSP. Thus the operator can confirm the effect of hyphen insertion. Then, upon actuation of the key HS by the operator, the hyphen scanning process is again executed. Thus reformatting is conducted starting from a character immediately following the hyphen in the word H (from the start of H2 in FIG. 4B) to obtain a status shown in FIG. 4B on the display DSP. Then, upon actuation of the key PT by the operator, there is executed a process PRN printing the text line by line, with reformatting from the start of the text buffer with the same algorithm as in the above-mentioned reformatting on the display. Consequently the display exactly corresponds to the print, which assumes the state shown in FIG. 4B.

Figure 8:
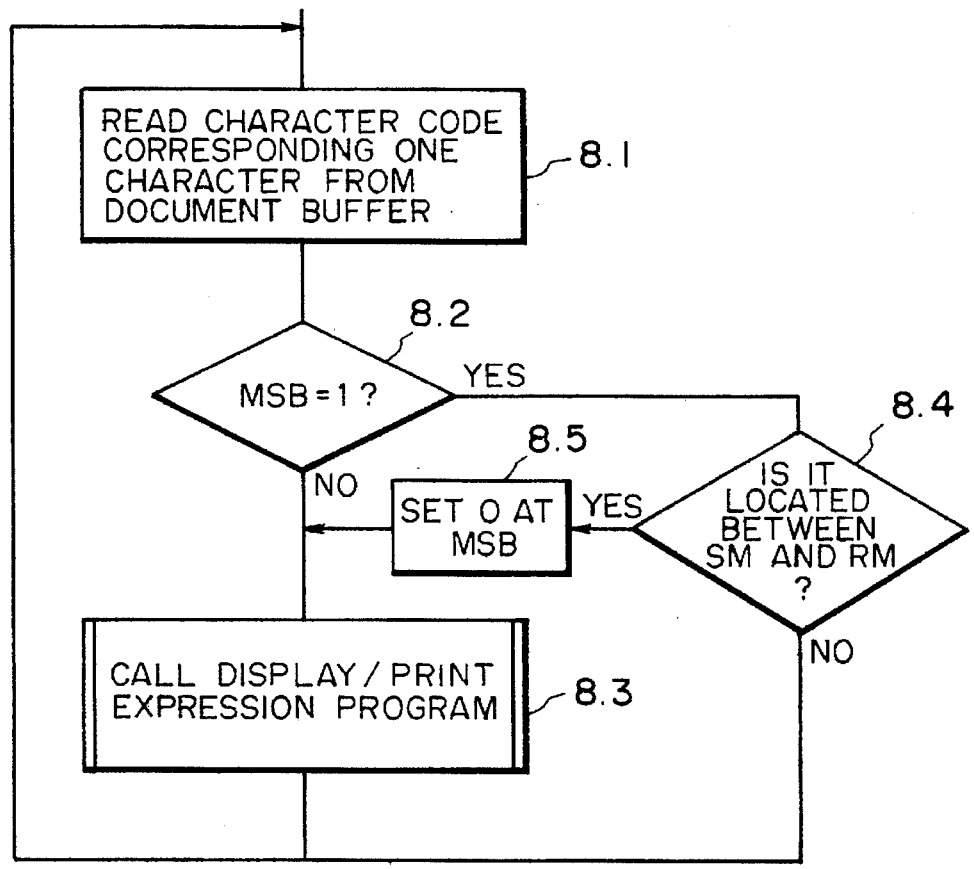
FIG. 8 is a view showing a soft hyphening process.

The above-mentioned soft hyphen can be considered as a character for temporarily dividing a word in representing a text on the display or on paper. As an example, for a word "hyphen", the appropriate insertion of soft hyphen is done as "hy . . . phen". A word containing such soft hyphen is meaningful only when it is divided into the right-hand end of a line and the left-hand end of a next line. In case a word is deleted from the first-mentioned line, the soft-hyphenated word is entirely returned to the line, and, in such case, a representation "hy . . . phen" is unnatural. Therefore it is reproduced as "hyphen" without the soft hyphen, as shown in FIG. 8. However the soft hyphen information is retained in the text buffer TEX, and is disregarded at the display or printing, according to MSB=1 or 0. The soft hyphen information retained in the text buffer can be utilized in case the word has to be divided at the end of a line. Also as will be apparent from FIG. 7, the input of the soft hyphen can be made in the same manner as that of the hyphen, with character codes capable of distinguishing the soft hyphen from the hyphen. For example, of the hyphen is represented by a code $2D_H$, it is convenient, for the purpose of control, to represent the soft hyphen by $AD_H$ by turning on the most significant bit.

OTHER EMBODIMENTS

In the foregoing explanation, the hyphen insertion is conducted by the operator, but there may be employed automatic hyphenation based on the spelling verifier technology recently developed. Also the text buffer, which is provided in the RAM in the foregoing embodiment, may be provided in a floppy disk or a hard disk.

As explained in the foregoing, the present invention gives the notice for hyphenation to the operator at the stage of editing, so that the judgement of a operator is not needed at the stage of printing, contrary to the conventional text processing apparatus. Besides the hyphen or soft hyphen inserted by the operator is not temporary but is memorized in the text, so that the printing can be done without additional care if the hyphenation is once done in the editing. Furthermore, the present invention is applicable to a text processing apparatus with a reformatting function, in simple manner by a modification or an addition of software, if a key operation for starting the hyphen scanning (aforementioned combined use of a control key) is made available.

What is claimed is:

1. A text processing apparatus comprising:

input means for entering a character train including characters;

memory means for storing characters entered by said input means;

display means for displaying characters stored in said memory means;

first control means for effecting a word wrap-around function on characters of a character train to be displayed by said display means;

designating means for designating hyphenation of the character train displayed by said display means after said first control means effects a word wrap-around function;

dividing means, in response to the operation of said designating means, for dividing a character train into a first portion to be displayed on one line and a second portion to be displayed on the next line when the character train exceeds a right margin of said display means after a word wrap-around function on the character train is performed; and second control means for moving each of the first and second portions of the character train to execute the hyphenation operation designed by said designating means.

2. A text processing apparatus according to claim 1, wherein said dividing means comprises determining means for determining a dividing position of the character train in accordance with a syllable of the character train and for dividing the character train in response to a result of a determination by said determining means.

3. A text processing apparatus according to claim 1, wherein said display means has a display capacity sufficient to display a plurality of lines of characters.

4. A text processing apparatus according to claim 1, further comprising means for displaying a portion of the character train divided by said dividing means on said one line.

5. A text processing apparatus according to claim 1, further comprising means for entering a hyphen into the character train divided by said dividing means.

6. A text processing apparatus according to claim 1, wherein a portion of the character train is moved to said one line in response to insertion of a hyphen by means for entering a hyphen.

7. A text processing apparatus comprising:

input means for entering a character train comprising a plurality of characters;

memory means for storing characters entered by said input means;

display means for displaying characters stored in said memory means on a display screen having a display capacity sufficient to display a plurality of lines of characters;

first control means for effecting a word wrap-around function on characters to be displayed by said display means;

designating means for designating hyphenation of said character train displayed on a line where a cursor displayed by said display means is located after said first control means effects a word wrap-around function;

dividing means, in response to the operation of said designating means, for dividing a character train on a next succeeding line of the display screen of said display means; and second control means for inserting a hyphen into a dividing position of said character train, and for displaying the character train divided by said dividing means on a plurality of lines of said display means after insertion of the hyphen at the dividing position of the character train.

8. A text processing apparatus according to claim 7 wherein said dividing means comprises determining means for determining a dividing position of the character train in accordance with a syllable of the character train and for dividing the character train in response to a result of a determination by said determining means.

9. A text processing apparatus according to claim 7 wherein the character train is displayed on first and second lines, said apparatus further comprising means for displaying a portion of said character train divided by said dividing means on the first line.

10. A text processing apparatus according to claim 7 further comprising means for entering a hyphen into a character train divided by said dividing means.

11. A text processing apparatus according to claim 7 wherein said first control means subjects a portion of said character train to a word wrap-around function to a preceding line in response to entry of a hyphen by said means for entering a hyphen.

12. A text processing apparatus comprising:

input means for entering a plurality of characters comprising a word and a space;

memory means for storing the word and the space, wherein the space punctuates the word comprising characters entered by said input means;

display means for displaying the word and the space stored in said memory means;

first control means for executing a word wrap-around operation on an input word when the input word exceeds a right margin of said display means to move the input word to the next line;

designating means for designating hyphenation of a word subjected to the word wrap-around operation;

dividing means, in response to the operation of said designating means, for dividing an input word moved to the next line in a word wrap-around operation; and second control means for displaying the input word divided by said dividing means on a plurality of lines of said display means.

13. A text processing apparatus according to claim 12, wherein said dividing means comprises determining means for determining a position of a word at which the word will be divided in accordance with a syllable of the word.

14. A text processing apparatus according to claim 12, wherein said display means has a sufficient display capacity to display a plurality of lines of characters.

15. A text processing apparatus according to claim 12, further comprising means for displaying a part of the input word divided by said dividing means on a preceding line.

16. A text processing apparatus according to claim 12, further comprising means for entering a hyphen into the input word divided by said dividing means.

17. A text processing apparatus according to claim 12, wherein a part of the input word is subjected to a word wrap-around operation to move the word to a preceding line in response to entry of a hyphen by said means for entering a hyphen.

* * * * *

UNITED STATES PATENT AND TRADEMARK OFFICE
CERTIFICATE OF CORRECTION

PATENT NO. : 5,634,094
DATED : May 27, 1997
INVENTOR(S) : HIROYUKI UEDA

It is certified that error appears in the above-identified patent and that said Letters Patent is hereby corrected as shown below:

ON THE COVER PAGE

Item [57] Abstract:

Line 10, "of" should read --of a--.

COLUMN 1

Line 15, "a" should be deleted.
    Line 16, "of" should read --of a--.
    Line 37, "same" should read --the same--.
    Line 41, "the" should be deleted.
    Line 43, "hypen" should read --hyphen--.
    Line 50, "the" should be deleted.

COLUMN 2

Line 44, "insert ion;" should read --insertion;--.

UNITED STATES PATENT AND TRADEMARK OFFICE
CERTIFICATE OF CORRECTION

PATENT NO. : 5,634,094    Page 2 of 2
DATED      : May 27, 1997
INVENTOR(S): HIROYUKI UEDA It is certified that error appears in the above-identified patent and that said Letters Patent is hereby corrected as shown below:

COLUMN 4

Line 8, "next third line." should read --next, third line--.
　　　Line 14, "visually" should read --not visually--.

COLUMN 7

Line 40, "claim 7" should read --claim 7,--.
　　　Line 46, "claim 7" should read --claim 7,--.

COLUMN 8

Line 1, "claim 7" should read --claim 7,--.
　　　Line 4, "claim 7" should read --claim 7,--.

Signed and Sealed this

Sixteenth Day of December, 1997

BRUCE LEHMAN

Attest:

Attesting Officer

Commissioner of Patents and Trademarks